April 29, 1924.
J. S. LANG
1,492,332
SHOCK ABSORBER
Filed Dec. 21, 1922
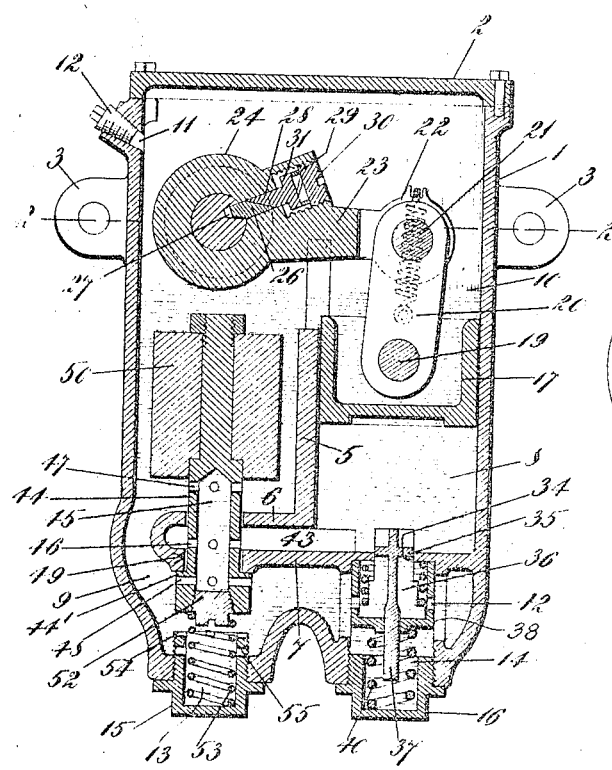
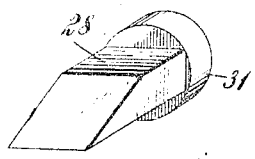
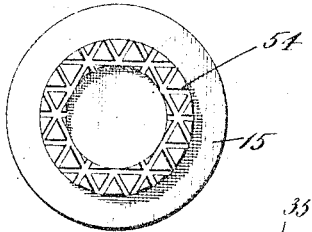
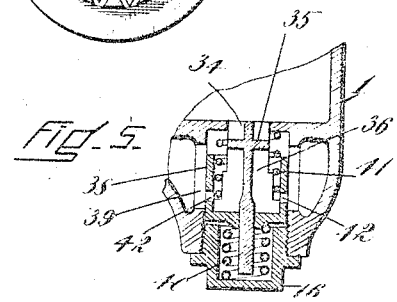
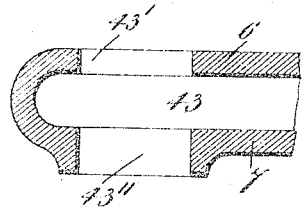
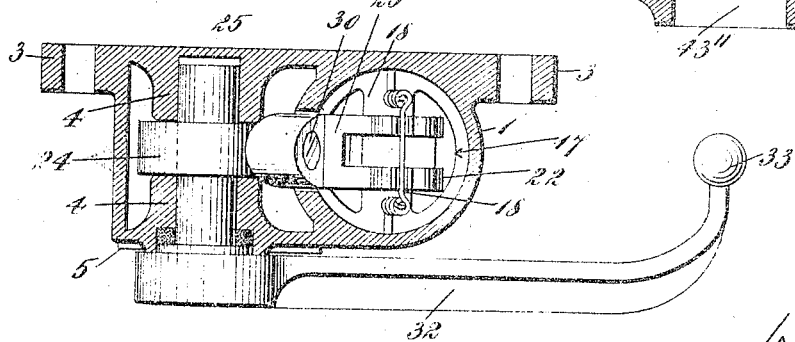

Patented Apr. 29, 1924.

1,492,332

UNITED STATES PATENT OFFICE.

JAMES S. LANG, OF WATERTOWN, MASSACHUSETTS.

SHOCK ABSORBER.

Application filed December 21, 1922. Serial No. 608,188.

*To all whom it may concern:*

Be it known that I, JAMES S. LANG, of Watertown, in the county of Middlesex and State of Massachusetts, a citizen of the United States, have invented a new and useful Improvement in Shock Absorbers, of which the following is a full, clear, and exact description, reference being had to the accompanying drawings, forming a part of this specification, in explaining its nature.

The present invention relates to that class of shock absorbers which are especially adapted for motor vehicles and in which the force required to pass a fluid through a constricted opening is utilized to prevent excessive vibration or rebound.

The object of the invention is to provide a generally improved shock absorber embodying means for automatically varying the area of the opening or passage through which the fluid is forced, and therefore the amount of force brought into play whenever such variation in the amount of force is required to effectually check the vibration or rebound of the vehicle body. It is also my object to provide a shock absorber having extreme sensitiveness, of relatively few and accessible parts, and means for firmly securing and accurately aligning such parts.

The invention can best be seen and understood by reference to the drawings in which an absorber embodying the invention is shown, and in which—

Figure 1 is a medial vertical cross section.

Fig. 2 is a horizontal section on line 2—2 of Fig. 1.

Fig. 3 is an enlarged view of a fastening, also shown in Fig. 1.

Fig. 4 is a plan view of a valve stop and plug also shown in Fig. 1, and

Fig. 5 is a medial vertical cross section of a combination inlet and discharge valve also shown in a different position in Fig. 1.

Fig. 6 is a vertical section of a detail of construction to which special reference will later be made.

Referring to the drawings:

1 represents a casing having a removable cover 2. Projecting laterally from the casing are lugs or ears 3 by which it may be secured to the body or framework of a vehicle. On the inside the casing is provided with spaced bearings 4 for a rock shaft later to be referred to. The interior of the casing is also provided with various members or partitions 5, 6 and 7, respectively, which provide within it a compression chamber 8, and outside this chamber immediately adjacent thereto a secondary or expansion chamber 9, with openings between the two chambers, certain of the partitions assisting in the valvular control of said openings.

The casing forms a receptacle for oil or other suitable fluid contained within its respective chambers, and maintained within the casing at about the level indicated at 10. The oil or other fluid is introduced into the casing at the top by way of the inlet 11, closed by the filling plug 12. At the bottom the casing is provided with outlet openings 13 and 14 closed by plugs 15 and 16. These openings provide outlets for the oil and also openings through which the parts above may be machined and through which certain of the working parts may be introduced into the casing.

The compression chamber 8 is within a cylinder formed by the co-operation of the wall or partition 5 with the walls of the casing. Contained to reciprocate within the cylinder is a piston 17. The piston is provided with interior cheeks 18 within which a pin 19 is fixed to cross the space between the cheeks. Pivotally secured to the pin is a link 20 which is also pivotally secured to the pin 21 fixed in the spaced ends 22 of a rocker arm 23.

The rocker arm 23 is provided with a hub 24 secured to a rock shaft 25, which turns within the spaced bearings 4 in the casing above referred to. The hub 24 is held in relation to the shaft 25 by means of the key 26 engaging a key seat 27 formed in the shaft 25. It will be noted that the opposite sides of the keyseat 27 have a substantial inclination with reference to each other and that the sides of the key 26 positioned therein have a corresponding inclination. That portion of the key 26 which occupies the keyway in the hub 24 is also provided with two inclined faces one of which is engaged by a correspondingly beveled wedging piece 28. Pressure is exerted upon the wedging piece 28 by the tension plug 30 through the medium of the lock washer 29 by which the plug is prevented from unscrewing. In order to provide a suitable bearing surface for the lock washer and plug the base of the wedging piece 28 carries a bearing disc 21. By reason of the beveling of the keyseat 27, key 26, and the wedging piece 28, the pressure exerted by the plug 30 will firmly tighten the key 26 into both keyseat 27 and the keyway in the hub 24, fastening the latter firmly and without backlash upon the shaft 25.

Either keyed upon the outer end of the shaft 25 or constructed integrally therewith is an external rocker arm 32 provided with a ball 33 for making a ball and socket connection with any suitable means (not shown) for connecting it to the axle of a vehicle.

With this arrangement of parts it will be seen that any change in the relative positions of the axle and the vehicle frame or body due to irregularities in the roadway will act to move the piston 17, which is raised or lowered in the cylinder as the case may be.

Referring now to the means for controlling the passage of oil between the compression chamber 8 and the secondary or expansion chamber 9: The wall or partition 7 in the casing extends beneath the cylinder containing the pressure chamber and forms the bottom wall of this chamber. Within the partition 7 forming a valve seat at the lower end of the cylinder is located an opening or port 34. This port is between the compression chamber and the secondary chamber which, as shown in Fig. 1, extends beneath the compression chamber.

The port 34 is controlled by a valve 35, slidably fitting therein, which permits of a relatively free flow of oil from the secondary chamber into the cylinder when the piston is raised, and permits a discharge of oil from the compression chamber to the secondary chamber under a heavy pressure only. The valve 33 is guided with reference to the opening 34 both above and below the valve by guiding fins 36, the valve body being also extended below to form a guide spindle 37. The lower ends of the guiding fins 36 slidably fit the interior bore of a valve support 38, which itself slidably fits within guiding fins 39 suitably located about the support. In its normal position the support 38 is held in firm contact with the under side of partition 7 by the pressure of the relatively heavy spring 40 which engages the lower end of the support which is perforated to permit the passage of valve stem 37. The guiding fins 36 are shouldered to receive a relatively light spring 41 also resting against the lower side of the partition, and are thereby kept normally in contact with the valve support 38. The arrangement of the parts is such that with the valve support 38 in its normal position as shown in Fig. 1, in contact with the lower side of partition 7, the valve 35 will effectually close the passage 34. The walls of the valve support 38 are provided with ports 42 permitting a free passage of fluid which passes also between the guiding fins 36 and 39.

In operation, an excess of pressure in the secondary chamber 9 over that in chamber 8, due to the rise of the piston exerted on the lower side of the valve 35, will cause the latter to rise, opening the passage 34 and compressing the light spring 41, and conversely a heavy excess of pressure in the chamber 8 over that in the secondary chamber 9 exerted upon the upper side of the valve 35, due to the descent of the piston in the cylinder, will depress the valve, as shown in Fig. 5, depressing also the valve support 38, compressing the heavy spring 40 and opening the passage 34 and permitting the escape of the fluid from the compression chamber.

The partitions 6 and 7 cooperate with one another to form an extension passage 43 from the lower end of the compression chamber. These partitions are bored to provide an outlet from the compression chamber by way of openings 43', 43" oppositely arranged and which receive with a sliding fit a cylindrical valve 44, the bore of partitions 6 and 7 around the openings 43', 43" forming a valve seating.

In its preferred form as shown in Fig. 1, the valve 44 is provided with a hollow cylindrical space 45 forming a passageway for the transference of liquid from the compression space to the secondary chamber and vice versa. Ports 46, 47 and 48 are bored through the cylindrical walls of the valve. By means of these ports the passage of fluid is controlled as movement of the valve takes place. In order that the valve may be free from friction and in perfect balance, the ports 46, 47 and 48 are spaced equally around the circumference of the valve. In its normal position as shown in Fig. 1 there is free communication between the compression space 8 and the secondary chamber 9 by way of the wide open ports 46, the interior space 45 and the ports 47 and 48. When the fluid passes from the compression space 8 to the secondary chamber, entering the valve through ports 46, its path is divided in the valve space 45, one portion passing out by way of ports 47 and the other by way of ports 48. The edge 49 of the valve seating at the upper surface of partition 7 forms a working edge in connection with the ports 46, closing the latter when the valve is depressed and opening them when the valve is raised.

The point of greatest resistance to the flow of fluid through the valve is preferably at the port 46, determined by the closing edge 49, and therefore the area of port 46 is made smaller than the aggregate area of ports 47 and 48. Ports 47 and 48 are made of such sizes and angles that their capacities for the discharge of fluid under the same pressure are substantially equal, and the reactive effect of the discharge of fluid from both series of ports is to neutralize each other. The valve being thus unaffected by the flow of fluid through it will be in perfect dynamic and static balance, as far as such flow is concerned.

The valve 44 as before stated, has a freely sliding fit within the openings 43', 43" in partitions 6 and 7, and is so fitted that a pressure exerted upon the fluid in chamber 8 will result in a limited upward flow of fluid through partition 6 along the outside wall of the valve 44, and also a limited downward flow of fluid through partition 7 along that portion of the outside wall of the valve 44. Such flow of the fluid will take place in the form of a very thin annular sheet or jet along the outer surface of the valve body. Directly above ports 48 the diameter of the valve is enlarged forming a circular shoulder or edge 44' upon which the discharge downward through the partition 7 may impinge.

The valve is extended at its upper end to form a spindle which is shouldered to receive a weight 50 which is carried thereby. In order to introduce the weight into the casing, the latter is provided with an opening on one side sufficiently large for the purpose, normally covered by the cover plate 51, after which the valve is inserted from below through the opening 13. The upward flow of the fluid through partition 6 along the outside of the valve 44 will impinge upon the lower end of the weight 50 forming an edge portion or shoulder to the valve, the effect of such flow varying as the distance between the weight and partition 6 is varied.

It is therefore seen that the upwardly-flowing jet through partition 6 tends to raise the valve 44, and the downwardly-flowing jet through partition 7 tends to depress it.

The shoulder 44' on the valve 44 directly above ports 48 forms a stop limiting the upward movement of the valve by coming into contact with the lower side of partition 7, and while in its upper normal position as shown in Fig. 1, blocking the clearance between the valve body and the hole through the partition 7, receives the full influence of the downwardly-flowing jet through partition 7. As the valve is moved downward the shoulder moves farther away from partition 7 and the influence of the downwardly-flowing jet becomes rapidly less, while the weight 50 above approaches the upwardly-flowing jet which has an increased effect.

At the lower end of the valve the cavity 45 is closed with a taper plug 52 which is also adapted to receive the end of a supporting spring 53. The lower end of the spring 53 is retained in a suitable socket formed in the closing plug 15, thereby supporting the valve and its attached weight in its normal open position as shown. The valve and its attached weight, supported in a state of balance upon its supporting spring 53, is free to move in a vertical direction in response to such forces as may be brought to bear upon it.

A stop limiting the downward movement of the valve is provided by its coming into contact with the upper edge 15' of the spring-containing cap 15 when the valve is in its extreme lower position, in which position ports 46 are fully closed except for such leakage as may be due to the clearance between the body of the valve and the hole through partition 7.

It is important that the movement of the valve 44 be uninfluenced either by pernicious rebound due to striking against the stop or sticking upon the stops due to the adhesiveness and viscosity of the fluid used. The tendency of the valve stop surfaces to stick together is the result of a vacuum formed between them when force is exerted to draw them apart, and which is contributed to by the adhesion of the fluid to the metal and its viscosity tending to seal the interior areas at their edges from the entrance of the surrounding oil. Inasmuch as the fluid can only penetrate between the striking surfaces of the stop from the bordering edge or perimeter of such surfaces, the tendency of the surfaces to stick together will be dependent upon the ratio of the projected area of the stop to its perimeter. Therefore in order to prevent undue sticking while still providing a sufficient area to sustain the wear of impact, the ratio of the area to its perimeter may be decreased to the desired point by narrowing the area and providing passages or grooves whereby the oil will find a ready access to the interior areas. Accordingly the stop formed by the upper annular edge 15' of the plug 15 is provided with striking facets bordered with grooves 54 permitting the entrance of fluid between surfaces. Additional means of breaking the tendency to form a vacuum below the plug 52 are provided by holes 55 bored through the walls of plug 15 near its top, allowing free access of oil to the space below plug 52. It is to be seen therefore that the areas of the stop surfaces are proportioned to their perimeters so that there will be a sufficient tendency of the stops to stick together to stop a pernicious rebound but not sufficient to cause actual sticking to take place. Any tendency of the valve 44 to stick when its shoulder or edge 44' is contacting with the lower side of partition 7 is prevented by the injection of fluid onto the edge 44' as previously explained, any tendency to a vacuum being thereby broken by the passage of fluid through the joint.

Reference will now be made to the effect of the movement of the piston 17 upon the valve 44:—

As before intimated, the valve when unaffected by other forces takes its position as shown in Fig. 1 in a state of suspensional balance upon its supporting spring 53 in which position all its ports are open. It will now be assumed that the piston 17 is moved downward in the chamber 8, resulting in an excess of pressure in chamber 8 over that in the auxiliary chamber 9. This will cause a flow of fluid through ports 46, dividing in cavity 45, and escaping by way of ports 47 and 48. This flow of the fluid will not, however, influence the movement of the valve as the reactive effects of both ports 47 and 48 neutralize each other, being equal and opposite in direction. A flow will also take place through the opening in partition 7 alongside the outer wall of the valve 44 in the form of an annular jet, which will impinge upon the shoulder stop directly above ports 48 and by its pressure or impact will slightly depress the valve, overcoming the tension of the spring 53. As the depression of the valve continues its shoulder is carried farther from the influence of the jet, while the weight 50 is brought closer to the corresponding jet flowing upwardly through the partition 6 and having an opposing effect. The depression will continue until the effect of the downwardly-flowing jet balances the combined effect of the upwardly-flowing jet and the added tension of the supporting spring, when no further depression will take place, the valve coming to rest in a partially closed position. If the valve is depressed by other means below the point just indicated, while the flow continues the spring 53 will be further compressed, and upon the removal of the depressing cause it will be returned to its former position as the spring overcomes the inertia of the weight 50, and upon the cessation of the annular flow along the exterior of the valve body will return to the normal position shown in Fig. 1.

It is thus seen that the downward flow of fluid alongside the exterior wall of the valve 44 passing through the opening in partition 7, tends to move the valve from its normal wide open position to one more nearly closed, from which it may readily be either completely closed or widely opened.

The flow of liquid affecting the valve in the above manner is brought about by the movement of the piston 17 which by suitable means is connected to the vehicle axle. In this manner the movement of the vehicle axle is utilized to aid or supplement the action of the weight 50, and to whatever extent may be desired by a proper proportioning of the parts.

Having described the effect upon the valve of the annular jets flowing alongside its exterior from the passage 43, reference will now be made to the function of the weight 50 and its attached valve, without reference to the effect of the flow of liquid already described.

The weight 50 and the attached valve 44 may be considered as one with reference to the effects of their inertia. The weight 50 and valve 44 in normal position are supported by the spring 53 in static balance as shown in Fig. 1 or if desired resting lightly against its upper stop. If depressed from this position and state the spring 53 will be compressed and upon release will return to its original position as the inertia of the weight and valve is overcome by the spring. If now the absorber casing 1 carrying the partitions 6 and 7, together with the spring-supporting plug 15, be suddenly raised, the inertia of the weight, due to its considerable mass, will tend to cause it to lag behind the rise of the casing, compressing the spring 53 and resulting in a relative movement between the casing and its valve. This relative movement if sufficiently great will close the ports 46. If the upward movement of the casing is not acceleratingly continued the compressed spring 53 will in turn overcome the inertia of the weight and valve which, overtaking the casing, will regain its original position reopening the ports 46.

The operation of the absorber is as follows:—

It will be assumed that all the parts of the shock absorber are in normal position, with ports 46 open, the piston occupying a position about midway of the cylinder, and that the vehicle with its axle in normal relation to the body encounters a road surface having a large number of small inequalities, not in themselves sufficient to cause a rebound. In passing over these inequalities the axle is vibrated rapidly up and down as it follows the contour of the ground, with a small range of movement. The rocker arm 23 and piston with it have a corresponding movement. Due to the fact that the annular flow of fluid along the exterior of the valve body through partitions 6 and 7 is rapidly intermittent and to a slight extent reversed in direction on account of lack of pressure in the compression chamber on the upward stroke of the piston, the comparatively heavy weight 50 is only slightly influenced thereby, and remains only very slightly depressed and the valve ports 46 remain nearly wide open, permitting a relatively free communication between the compression chamber 8 and the secondary chamber 9. This permits a free vibration of the piston without interfering with the resiliency of the springs.

It will now be assumed that the vehicle encounters a raised obstruction in the roadway having an abrupt rise succeeded by a corresponding decline and of sufficient height and width under ordinary circumstances to produce a violent rebound. The vehicle and shock absorber with it reaches the obstruction with all its parts as before in substantially normal positions, and as the wheels mount the rise the axle is brought nearer to the body of the vehicle, compressing the vehicle springs. Simultaneously with the rise of the axle the hub 24 is turned, lifting the rocker arm 23 which raises the piston in the cylinder, and oil is drawn into the compression chamber below the piston from the secondary chamber by way of the valve 35, which is easily raised compressing the light spring 41, the ports 46 in the valve 44, and along the annular jet passageway surrounding the valve body. If, as assumed above, the approach is quite abrupt, followed by an immediate decline, the inertia of the vehicle body will prevent an appreciable rise of the vehicle body until the wheels have reached the top of the obstruction, when an incipient rebound will begin. The vehicle body then rises slightly from its line of travel and simultaneously the axle begins to move away from the body as the wheels pass the horizontal crown, moving the piston downward in the cylinder and discharging fluid through the valve ports 46 and through the annular clearance between the body of the valve and the openings in partitions 6 and 7. As heretofore explained, the discharge of the fluid through the annular clearance between the body of the valve and the openings in partitions 6 and 7 tends to depress the valve. On this tendency of the valve to close, due to the impulse of the annular jets, there is superposed a force also tending to close it, due to the inertia of the weight 50 in conjunction with the slight rise of the vehicle body in passing the obstruction. The effect of the two forces mentioned will quickly and completely close the valve ports 46 preventing any substantial flow of oil through the valve. As the wheels pass over the crown of the rise therefore the vehicle springs will be held in a state of compression and the rebound prevented, as the oil can only slowly escape from the compression chamber through the annular clearances surrounding the valves 44 and 35. In order that the pressure within the compression space 8 may not become so great as to endanger either structure of the absorber or its attachments to the vehicle, it is not allowed to exceed a determinate amount through the action of the valve 35 which is opened, as shown in Fig. 5, by such excessive pressure. As the wheels descend on the further side of the obstruction the weighted valve tends to regain its first position and the ports 46 are partially opened. As the opening of the valve continues the shoulder on the valve immediately above ports 48 is brought more and more into the influence of the downwardly-issuing annular jet surrounding the valve, tending to slow up its return and easing the impact of the valve against the stop.

A case the opposite to the preceding will now be considered, in which the vehicle passes a wide and deep depression in the roadway.

The vehicle and shock absorber with it approaches as before with all its parts in substantially normal positions. Due to the inertia of the vehicle body, when the wheels go into the depression, the axle moves down and away from the vehicle body. As this movement takes place the piston moves downward in the cylinder, the fluid passing out through ports 46 and through the annular clearances surrounding the valves 44 and 35. The discharge of fluid through the clearance between valve 44 and the opening through partition 7 tends to depress the valve as before shown. This action is, however, opposed by the inertia of the weight 50, due to the slight fall of the vehicle body, with the result that the ports 46 remain nearly wide open, permitting the fluid to pass with little resistance into the secondary chamber. Due to the fact that the resistance to the flow is slight, the piston moves downward with comparative freedom allowing the vehicle springs to expand beyond their normal state of compression, thus maintaining the vehicle body at nearly its former level. As the wheels pass the bottom of the hollow, the ports 46 are wide open and the vehicle springs remaining expanded maintain the vehicle body well up in position, and the flow of fluid through the valve ceases. The wheels now strike the rise on the opposite side of the hollow, and the piston regains its normal position in the cylinder, and the action in passing the top of the upward incline onto the level roadway beyond resembles somewhat that taking place in the case of the raised obstruction previously described.

In general terms, the movement of the axle of the vehicle tends, by means of the liquid pressure brought about, to move the valve toward a position from which it may readily be closed or opened, and with the cooperation of the inertia of the weighted valve will close the said valve, but will not close it when opposed by such inertia.

The means shown are preferred in the sense that they are considered best fitted for accomplishing the purposes of the invention, although it is obvious that they may well be varied without departing from the spirit of the invention.

Having thus fully described my invention, I claim and desire to secure by Letters Patent of the United States:—

1. A fluid check shock absorber for controlling the movement of relatively movable parts, comprising an element attachable to one of said parts and having a pressure chamber, said element being provided also with means permitting of the circulation of a fluid into and out of said chamber and consisting in part of a controllable outlet having a valve seating, a piston attachable to the other of said parts and reciprocable in said pressure chamber, a weighted valve for controlling said outlet, said valve having extension through said outlet and presenting an edge portion beyond the outlet, said part of the valve extending through the outlet fitting loosely within said valve seating to provide a clearance between it and said seating whereby fluid will pass therethrough and impinge upon said edge portion of the valve for assisting in the control thereof when the fluid is compressed in the pressure chamber, and means for yieldingly supporting the valve in a normal open position.

2. A fluid check shock absorber for controlling the movement of relatively movable parts, comprising an element attachable to one of said parts and having a pressure chamber, said element being provided also with means permitting of the circulation of a fluid into and out of said chamber and consisting in part of a controllable outlet having a valve seating, a piston attachable to the other of said parts and reciprocable in said pressure chamber, a weighted valve for controlling said outlet, said valve having extension through said outlet and presenting an edge portion beyond the outlet, said part of the valve extending through the outlet fitting loosely within said valve seating to provide a clearance between it and said seating whereby fluid will pass therethrough and impinge upon said edge portion of the valve for assisting in the closure thereof when the valve is open and the fluid is compressed in the pressure chamber, and means for yieldingly supporting the valve in a normal open position.

3. A fluid check shock absorber for controlling the movement of relatively movable parts, comprising an element attachable to one of said parts and having a pressure chamber, said element being provided also with means permitting of the circulation of a fluid into and out of said chamber and consisting in part of a controllable outlet with openings oppositely arranged and valve seatings around said openings, a piston attachable to the other of said parts and reciprocable in said pressure chamber, a hollow weighted valve controlling said outlet, said valve having an interior space with ports into and out of said space whereby fluid entering the valve space from the pressure chamber when compressed by the piston will flow through the valve space in opposite directions when the valve is open, said valve presenting an edge portion beyond each of said openings to the outlet, said portion of the valve extending through said openings to the outlet fitting loosely within said valve seatings around said openings to provide a clearance between the valve and said seatings whereby fluid will pass therethrough in opposite directions and impinge upon the edge portions of the valve, respectively, for assisting in the control thereof when the fluid is compressed in the pressure chamber, and means for yieldingly supporting the valve in a normal open position.

4. A fluid check shock absorber for controlling the movement of relatively movable parts, comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a weighted valve for controlling said outlet, means for yieldingly supporting the valve in a normal open position, a stop for said valve, and means whereby fluid from the pressure chamber will be directed into the joint between said stop and valve when said valve is contacting with said stop.

5. A fluid check shock absorber for controlling the movement of relatively movable parts, comprising an element attachable to one of said parts and having a pressure chamber, said element being provided also with means permitting of the circulation of a fluid into and out of said chamber and consisting in part of a controllable outlet having a valve seating and a valve stop, a piston attachable to the other of said parts and reciprocable in said pressure chamber, a weighted valve for controlling said outlet, said valve having extension through said outlet and presenting an edge portion beyond the outlet and said valve stop and with which stop the extension is adapted to have contact for limiting the open position of the valve, said portion of the valve extending through the outlet fitting loosely within said valve seating to provide a clearance between it and said seating whereby fluid will pass therethrough and be directed into the joint between said stop and valve, and means for yielding supporting the valve in a normal open position.

6. A fluid check shock absorber for controlling the movement of relatively movable parts, comprising an element attachable to one of said parts and having a pressure chamber, said element being provided also with means permitting of the circulation of a contained fluid into and out of said chamber and consisting in part of a controllable outlet, a piston attachable to the other of said parts and reciprocable in said pressure chamber, a weighted valve for controlling said outlet, means for yieldingly supporting the valve in a normal open position, and a stop for said valve, said stop presenting a number of striking faces to the perimeters of which the contained fluid has access when the valve is in engagement with said stop.

7. A fluid check shock absorber for controlling the movement of relatively movable parts, comprising an element attachable to one of said parts and having a pressure chamber, said element being provided also with means permitting of the circulation of a contained fluid into and out of said chamber and consisting in part of a controllable outlet, a piston attachable to the other of said parts and reciprocable in said pressure chamber, a weighted valve for controlling said outlet, means for yieldingly supporting the valve in a normal open position, and a stop for said valve, said stop being provided with a port for the entry of a contained fluid below the face of said stop.

8. A fluid check shock absorber for controlling the movement of relatively movable parts, comprising an element attachable to one of said parts and having a pressure chamber, said element being provided also with means permitting of the circulation of a fluid into and out of said chamber and consisting in part of a port with valvular mechanism for controlling said port, a piston attachable to the other of said parts and reciprocable in said pressure chamber, a flexible mechanism connecting said piston with the other of said parts and having within it a rock shaft and rocker arm, a combination key and adjusting wedge for connecting the rocker arm to said shaft, a set screw for retaining said wedge, and a lock nut interposed between the set screw and wedge.

9. A valve comprising a valve seat with port therein to be controlled, a two-directional valve for controlling said port, a valve support, means for mounting said support to occupy a normal defined position relatively to said valve seat and port and to be relatively movable away from the same, a resilient backing for said support, means for mounting the valve on said support whereby it will be movable with said support to open in one direction and be movable away from said support to open in a reverse direction.

10. A valve comprising a valve seat with port therein to be controlled, a two-directional valve, a valve support, means for mounting said support to occupy a normal defined position relatively to said valve seat and port and to be relatively movable away from the same, a resilient backing for said support, means for mounting the valve on said support to occupy normally a closed position and whereby it will be movable with said support to open in one direction and be movable away from said support to open in a reverse direction.

11. A valve comprising a valve seat with port therein to be controlled, a two-directional valve for controlling said port, a valve support, means for mounting said support to occupy a normal defined position relatively to said valve seat and port and to be relatively movable away from said seat and port, a resilient backing for said support, means for mounting the valve on said support to occupy a normal closed position when said support is in its normal defined position as aforesaid and whereby also the valve will be movable with said support to open in one direction and be movable away from said support to open in a reverse direction.

JAMES S. LANG.